Figure 1:
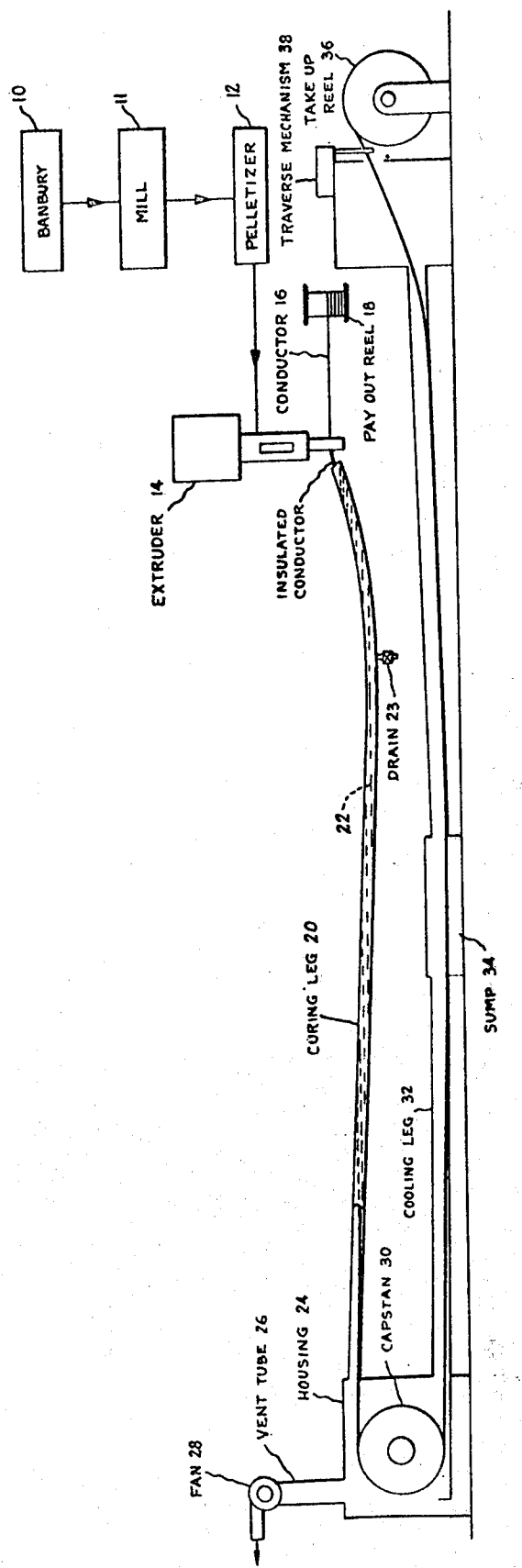
Figures 2, 3, 4, 5:
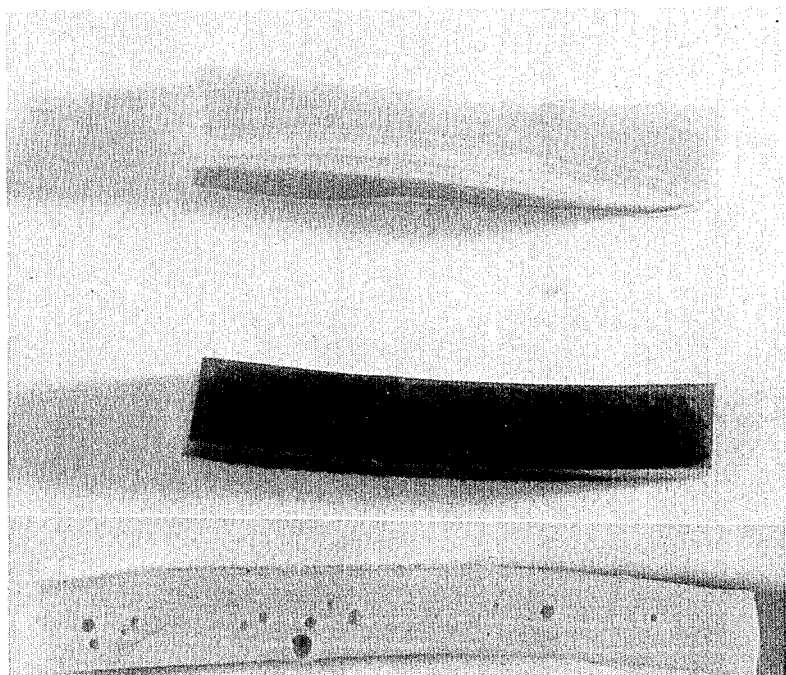

United States Patent [19]
MacKenzie, Jr.

[11] 3,959,558
[45] May 25, 1976

[54] PRESSURELESS CURING SYSTEM FOR CHEMICALLY CROSS-LINKING ETHYLENE-CONTAINING POLYMERS AND PRODUCT FORMED THEREBY

[75] Inventor: Burton Thornley MacKenzie, Jr., Monroe, Conn.

[73] Assignee: General Electric Company, New York, N.Y.

[22] Filed: Dec. 18, 1970

[21] Appl. No.: 97,462

Related U.S. Application Data

[63] Continuation-in-part of Ser. No. 679,870, Nov. 1, 1967, abandoned.

[52] U.S. Cl. ............................ 428/379; 260/42.14; 260/42.29; 260/42.42
[51] Int. Cl.[2] ............................................ C08K 9/04
[58] Field of Search .......... 106/308; 260/41 R, 41 A, 260/42.39, 42.14, 42.42; 264/174; 428/379

[56] References Cited
UNITED STATES PATENTS

| | | | |
|---|---|---|---|
| 2,888,424 | 5/1959 | Precopio et al. | 260/41 |
| 2,930,083 | 3/1960 | Vostovich et al. | 264/174 |
| 3,272,772 | 9/1966 | Russell | 260/41 |

Primary Examiner—Paul R. Michl
Attorney, Agent, or Firm—Raymond G. Simkins; Philip L. Schlamp; Frank L. Neuhauser

[57] ABSTRACT

A curable composition comprising an ethylene-containing polymer, a curing agent, and a mineral filler treated with an organic compound selected from the group consisting of maleic anhydride, dimethyl itaconate, and acrylic acid, is compounded and fabricated to the desired shape, such as an insulation layer over a conductor. The fabricated product is then passed through a nonaqueous heat transfer medium maintained at atmospheric or ambient pressure and at a temperature sufficient to effect curing in situ of the ethylene-containing polymer. The resulting cured composition is characterized as relatively dense (substantially non-porous) especially suitable for use as insulation for wire and cable.

15 Claims, 5 Drawing Figures

PRESSURELESS CURING SYSTEM FOR CHEMICALLY CROSS-LINKING ETHYLENE-CONTAINING POLYMERS AND PRODUCT FORMED THEREBY

This is a continuation-in-part of my then copending, but now abandoned, application for patent Ser. No. 679,870, filed Nov. 1, 1967 of the same title.

Thermosetting or cross-linked polyethylene compositions are well known in the art and have been used extensively, especially for insulating materials for wire and cable. In the conventional manufacture of wire and cable employing such insulation materials, a filler, curing agent and other additives are admixed with the polyethylene, the compounded admixture is then fabricated over a metallic conductor as an insulation coating and then cured to form a thermosetting or cross-linked coating. Such compositions are used elsewhere but to a lesser extent such as in the manufacture of pipe and moldable products. Other olefinic compositions have been used in the same or similar manner, but polyethylene has been the most widely used polyolefin. The physical properties and performance characteristics of the cured composition depends primarily upon its application, and the compounding recipes and procedures are varied according to the properties required.

According to conventional practice, the compositions are cured at high temperature, and pressures. In the manufacture of insulated wire and cable, for example, the fabricated article is passed from the extruder, where the curable composition is extruded over the conductor, to a steam chamber maintained under a pressure of about 200 to 250 psig, or higher. The high temperature is required in order to decompose the curing agent and thereby promote cross-linking, and the high pressure is required in order to produce a relatively dense (non-porous) vulcanizate. Quite obviously, there are numerous cost and control problems associated with a high pressure, steam curing system.

This invention has therefore as among its objects to provide a method for chemically cross-linking a filled ethylene-containing composition which obviates the need of a high pressure curing system, and which results in a relatively dense, cured composition.

Although this invention is described hereinbelow with particular reference to compositions useful as insulation for wire and cable, it should be understood that the compositions may be used in other fabricated and moldable products. The terms "wire" and "cable", as used herein and in the appended claims, are employed as synonymous terms and refer to an insulated electrical conductor.

In accordance with the broadest aspect of this invention, there is provided a curable composition comprising (1) an ethylene-containing polymer, (2) a curing agent, and (3) a mineral filler treated with an organic compound selected from the group consisting of maleic anhydride, dimethyl itaconate, and acrylic acid. In preparing the composition, the polymer, filler, organic member and other additives are intimately admixed as in a Banbury. During this compounding operation, the filler becomes treated by the organic compound. Where desired, the mineral filler may be pretreated with the organic compound and the treated filler is then admixed with the polymer and other additives. A suitable curing agent, desirably a tertiary organic peroxide, is then incorporated into the admixture to effect substantially cross-linking of the polymer upon curing. The composition is extruded as an insulation layer over a conductor, and then passed through a non-aqueous heat transfer medium maintained at about atmospheric pressure and at a temperature sufficient to cure substantially in situ the ethylene-containing polymer. The cured product is characterized as relatively dense and therefore particularly useful as an insulation material, as described hereinafter in greater detail.

This invention will be further appreciated by reference to the accompanying figures, which illustrate in greater detail a preferred manner of carrying out the novel process for the manufacture of wire and cable. In the drawing, FIG. 1 is a diagrammatic view in elevation of the apparatus used for carrying out the invention.

FIGS. 2–5, are photomicrographs, at a magnification of seven diameters, of typical sections of cured compositions prepared as described in the examples below.

The insulation composition is compounded as in a Banbury indicated at 10, and then passed to a mill 11 to sheet the composition for subsequent handling. As a practical matter, the compound is hopper fed to an extruder, and therefore the sheeted composition is generally granulated or pelletized at 12 in preparation for use as extruder feedstock. As explained hereinafter in greater detail, the mineral filler may be pretreated with the organic compound by intimately admixing the organic compound with the filler, and then adding the pretreated filler to the Banbury operation, or the filler and organic compound may be added separately to the Banbury where treatment of the filler occurs. The compound is fed to a conventional wire extruder 14. A metallic conductor 16 is passed from a pay-out reel 18 through the extruder where the polymeric compound is extruded to form a coating of insulation over the conductor.

Upon emerging from the extruder, the insulated conductor 19 is passed through an elongated tube 20 containing a heat transfer medium 22, such as an organic fluid, and further may be provided with suitable valve and drain means 23. The heat transfer medium is maintained at about atmospheric pressure and at an elevated temperature sufficient to effect substantial curing in situ of the polymer. The temperature required will depend primarily upon such factors as the type of polymeric compound, the heat transfer medium and the curing agent employed. The length of tube 20 and the rate of travel through the tube should allow sufficient dwell time of product 19 in the heat transfer medium to effect substantial curing of the polymer, and may be determined readily by one skilled in the art. Tube 20 is heated as by an electric heating coil (not shown) or other suitable means. Also, it should be understood that other means for maintaining the curing bath, such as a vat or tank, may be substituted for tube 20, but the tubular member provides a convenient and practical means for use in the manufacture of wire and cable requiring a minimum of apparatus and heat transfer medium.

Tube 20 terminates at housing 24 which preferably is vented to the atmosphere through vent tube 26 having an exhaust fan 28. Capstan 30 is maintained in housing 24, and the cable passing from the tube 20 is passed over the capstan and into an elongated cooling pipe 32, which is maintained at a temperature sufficiently low to cool the insulated conductor. Generally, it is sufficient to operate the cooling pipe at room temperature, and exhaust fan 28 draws air through the pipe counter to the cable passing therethrough. Where desired, other means may be employed for cooling the cable. For example, the cooling pipe may be provided with a jacket and a refrigerant passed through the jacket, or the cooling pipe may contain a fluid maintained at the desired low temperature. Here again, it should be understood that a vat or tank may be substituted for the cooling pipe 32. A sump 34 in cooling pipe 32 provides means for draining any fluids from the cable which may have been carried over from tube 20. The resulting product is then wound on take-up reel 36 provided with a traverse mechanism 38 to assure level winding of the cable.

As described above, the formed cable emerging from the extruder is passed through a heat transfer medium maintained at an elevated temperature sufficient to cure substantially the polymer. Also, the heat transfer medium is not maintained under pressure such as with the conventional practice of curing under steam pressure. It will be observed that the heat transfer medium must be substantially inert toward the polymer. Any of a number of heat transfer materials may be employed and these may include organic fluids, gases, molten salts, and salt solutions, and molten metal alloys. In the preferred embodiment of the invention, a polyalkylene glycol is employed, which may be either water soluble or water insoluble and have a viscosity range of from 50 to 90,000 Saybolt Universal Seconds at 100°F such as those sold under the tradename of Ucon fluids. Other suitable organic fluids include, for example, glycerol and esters thereof, and propylene glycol and esters thereof. Also, suitable gaseous heat transfer materials include, for example, air, carbon dioxide, and nitrogen, which at the curing temperature is substantially free of water vapor and substantialy inert to the polymer. The gaseous heat transfer medium, which may be preheated, is passed through the curing tube or chamber preferably countercurrent to the insulated conductor, and the curing is conducted at substantially atmospheric pressure.

In accordance with the invention, the curable composition comprises an ethylene-containing polymer, a curing agent, and a mineral filler treated with an organic compound selected from the group consisting of maleic anhydride, dimethyl itaconate, and acrylic acid. Also, certain additives are usually compounded with the polymeric blend. These compounding additives may include for example, an antioxidant such as polymerized trimethyldihydroquinoline, a lubricant such as calcium stearate to prevent the composition from sticking during fabrication, a non-combustible additive such as antimony oxide and a halogenated compound to promote flame retardance, a coagent such as polybutadiene to facilitate cross-linking, and a small amount of pigment or coloring agent. The compounding agents required may vary considerably, and there may be others than those mentioned, depending upon the properties sought for the end product.

Where desired, polyethylene may be used alone or may be used in conjunction with one or more other polymers, but this will depend largely upon the requirements of the end product. The ethylene-containing member may be polyethylene, which may be blended with other polymers, and copolymers of ethylene and other polymerizable materials. Suitable copolymers of ethylene include, for example, ethylene-propylene rubber, ethylene-propylene terpolymer, and ethylene-vinyl acetate. The amount of ethylene use in the copolymer will alter the properties of the end product, and therefore may be varied to achieve the required results. For example, a typical copolymer of ethylene and propylene comprises about 50 mole per cent of each component, and a copolymer of ethylene-vinyl acetate typically comprises about 72 to 95 per cent by weight ethylene and the balance being vinyl acetate.

The polyethylene or copolymer of ethylene may be blended with a chlorine-containing polymer, such as chlorinated polyethylene, chloro-sulfonated polyethylene, and polyvinyl chloride, to promote flame retardance of the composition. It is known that the flame retardant properties of polyethylene compositions may be enhanced by using a chlorine-containing polymer, and the compositions may contain up to about 15 per cent by weight chlorine based on the total weight of all polymers present. A higher chlorine content can adversely affect the composition by resulting in a porous product. The chlorine-containing polymer is relatively more expensive than the polyethylene, and therefore, it is desirable to use the minimum chlorine content which will provide sufficient flame retardance to enable the cured composition to pass the flame test specified by the product requirements. The tensile strength of the final product generally is increased with an increased proportion of the unchlorinated polymer or copolymer, but at least a minimum content of about 2 per cent by weight chlorine of the total polymeric components is used to impart the desired flame retardance property to the product. Thus, the proportions for the ingredients may be varied within the specified limits to meet the mechanical properties and performance characteristics desired for an insulation composition.

A suitable mineral filler is compounded with the insulation composition which provides the composition with sufficient strength necessary for fabricating the cable so that it will retain its structure during fabrication. The mineral fillers utilized in the composition may be any of those commonly employed in polymeric compositions and include, for example, aluminum silicate, aluminum oxide, calcium silicate and silica, and mixtures thereof. The filler may contain certain inert impurities, typically metallic oxides, which may range up to about 5 per cent by weight of the filler. These filler materials are well known and readily available on the market, and the type of filler used will depend largely on the desired properties for the end product and may be determined by one skilled in the art. The filler materials typically are calcined to reduce the moisture content to less than 0.5 per cent by weight, and generally possess a particle size of the order of 2 microns diameter and a specific gravity of about 2.5 to 2.8.

The function of fillers in polymeric insulation compositions is well known, and the amount of filler incorporated into the composition may be varied depending upon the properties desired in the cured product. The filler content may range from about 25 to 60 per cent by weight of the composition, and more preferably about 30 to 50 per cent by weight.

The mineral filler is treated with an organic compound selected from the group consisting of maleic anhydride, dimethyl itaconate, and acrylic acid. I have found quite unexpectedly that a composition having incorporated therein a mineral filler treated with said organic compound and cured by the system of this invention is substantially more dense (less porous) than the same composition having a filler which was not treated with said organic compound. Moreover, I have found that the invention is selective to mineral fillers, and that carbon black fillers treated and compounded in substantially the same manner result in a cured product which is relatively more porous and not suitable for use as an insulation material. It should be understood, however, that small amounts of carbon black may be added to the compound as a coloring pigment, and in such a case, the carbon black is used in a range of about two to seven parts per 100 parts of polymer. The filler is treated with about 0.15 to 4 per cent by weight of an organic compound, and more preferably 0.5 to 3 per cent. An excess of the organic compound apparently acts like a plasticizer, which consequently appears to degrade the tensile strength and electrical properties of the cured composition, and further results in a porous product and therefore is avoided.

The compounding operation is conducted within a temperature range high enough to render the admixture sufficiently plastic to work, but below the reacting temperature or decomposition temperature of the curing agent so that the curing agent will not decompose thereby causing at least partial or incipient curing of the polyethylene stock during the normal mixing cycle. Desirably, the curing agent employed in the operation is an organic peroxide, such as a tertiary peroxide, and characterized by at least one unit of the structure

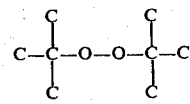

which decomposes at a temperature in excess of about 275°F. The use of these peroxide curing agents in effecting cross-linking of polymers such as polyethylene compounds is adequately described in U.S. Pat. Nos. 3,079,370, 2,888,424, 3,086,966 and 3,214,422, which patents are incorporated in this specification by reference. The most commonly used peroxide curing agent, and the agent preferred, is di-α-cumyl peroxide. Other useful curing agents include the tertiary diperoxides such as 2,5-dimethyl-2,5(t-butyl peroxy) hexane and 2,5-dimethyl-2,5-(t-butyl peroxy) hexyne-3, and the like diperoxy compounds.

The proportion of peroxide curing agent used depends largely on the mechanical properties sought in the cured product, for example, hot tensile strength. A range of from about 0.5 to 10 parts by weight of peroxide per hundred parts of polymer satisfies most requirements, and the usual proportion is of the order of two to four parts peroxide. In a typical production operation employing a tertiary peroxide as a curing agent, compounding is conducted at a temperature of from about 200° to 275°F. If compounding is conducted at a temperature much higher than the stated maximum, the peroxide will decompose thereby causing premature curing of at least a portion of the polymer. As a consequence, the compound will be difficult to fabricate and the final product will exhibit an irregular or roughened surface.

In a still further modification, the curable composition of this invention may be subjected to a vacuum prior to the curing operation. For example, the extruder may be vented and a vacuum drawn on the barrel of the extruder as the composition is fluxed or plasticized and advanced through the barrel by the extruder screw. Where desired, the composition may be fed to the extruder from a hopper maintained under a vacuum. Performing the operation under vacuum may be particularly advantageous in assuring a relatively dense product.

In the following examples, which further illustrate the invention, the compositions were prepared by conventional compounding technique according to the recipes shown in Table I. The amounts in the table for each component are parts by weight. The compounds were then formed into slabs measuring 4½ inches square and having a thickness of about 75 mils. The slabs were cured by immersion for two minutes in a polyalkylene glycol sold under the tradename Ucon LB-300-X having a viscosity in Saybolt Universal Seconds of 300 and maintained at a temperature of 200°C. The cured products were tested for degree of cure by toluene extract wherein a two-gram sample is extracted by boiling toluene for 16 hours substantially in accordance with the test described by ASTM D-297.

TABLE I

| Examples | 1 | 2 | 3 | 4 | 5 | 6 |
|---|---|---|---|---|---|---|
| Polyethylene | 100 | 100 | 100 | 100 | 100 | 100 |
| Aluminum silicate | 50 | 50 | 50 | | 50 | |
| Hydrated silica | | | | 50 | | |
| Thermax carbon black | | | | | | 40 |
| Polymerized trimethyldihydro-quinoline (antioxident) | 1 | 1 | 1 | 1 | 1 | 2 |
| Di-α-cumyl peroxide (90% active) | 3.5 | 3.5 | 3.5 | 3.5 | 3.5 | 2.2 |
| Maleic anhydride | 1.5 | | | 1.5 | | 1.5 |
| Dimethyl itaconate | | 5 | | | | |
| Acrylic acid | | | 1.5 | | | |
| Toluene extract (% on compound) | 9.5 | 14.4 | 12.1 | 15.6 | 11.6 | 22.2 |

The toluene extracts show that the polymer was cured to a relatively high degree, which compares favorably with the conventional steam curing process which typically has a toluene extract ranging from about 6 to 15 per cent. Sample runs for Examples 1, 2, 3 and 4 were visually examined for porosity and found to be relatively dense (exhibiting little or no porosity) and therefore acceptable for use as insulation for wire and cable. This feature is clearly illustrated in FIGS. 2 and 3 which are photomicrographs of Examples 1 and 4, respectively. Examples 5 and 6 were run to illustrate more clearly the problem of porosity and the value of treating the filler with the organic compound, and further to show that the invention is not applicable to a polymer system filled with carbon black. The photomicrograph of FIGS. 4 and 5 of Examples 5 and 6, respectively, show that these samples are relatively porous, and therefore not acceptable as insulation for wire and cable.

What I claim as new and desire to secure by Letters Patent of the United States is:

1. A method of curing a composition comprising an ethylene containing polymer and mineral filler at substantially atmospheric pressure to a relatively dense and substantially non-porous cured polymeric composition, comprising the steps of: treating a mineral filler with an organic compound selected from the group consisting of maleic anhydride, dimethyl itaconate, and acrylic acid, by admixing said mineral filler with about 0.15 to 4.0 per cent of said organic compound by weight of the filler, and preparing the composition by admixing ingredients of the composition comprising an ethylene containing polymer, said mineral filler and treating organic compound, and curing agent; and thereafter heating the said admixed composition at about atmospheric pressure in a non-aqueous heat transfer medium to a temperature and for a dwell time sufficient to effect an in situ cross-linking cure of the ethylene containing polymer to a relatively dense and substantially non-porous cured filled polymer composition.

2. The method of curing of claim 1, wherein the mineral filler is pretreated with said organic compound by intimately admixing the organic compound with the filler and then admixing the pretreated filler with the other ingredients of the composition.

3. The method of curing of claim 1, wherein the mineral filler is treated with said organic compound by intimately admixing the mineral filler and the organic compound together with the ethylene containing polymer.

4. The method of curing of claim 1, wherein the ethylene containing polymer is selected from the group consisting of polyethylene, copolymers of ethylene and propylene, and copolymers of ethylene and vinyl acetate, and mixtures thereof.

5. The method of curing of claim 1, wherein the mineral filler content of the ethylene containing polymer is about 25 to 60 per cent by weight of the composition.

6. The method of curing of claim 5, wherein the mineral filler is selected from the group consisting of aluminum silicate, aluminum oxide, calcium silicate, silica, and mixtures thereof.

7. The method of curing of claim 6, wherein the mineral filler content of the ethylene containing polymer is about 30 to 50 per cent by weight of the composition.

8. The method of curing of claim 7, wherein the mineral filler is treated with about 0.5 to 3 per cent by weight of said organic compound.

9. The method of curing of claim 5, wherein the curing agent is a tertiary organic peroxide in amount of about 0.5 to 10 parts by weight per hundred parts by weight of polymer.

10. A method of curing a composition comprising an ethylene containing polymer with mineral filler at substantially atmospheric pressure to a relatively dense and substantially non-porous cured polymer composition, comprising the steps of: treating a mineral filler selected from the group consisting of aluminum silicate, calcium silicate, silica, and aluminum oxide, and mixtures thereof, with an organic compound selected from the group consisting of maleic anhydride, dimethyl itaconate, and acrylic acid, by admixing said mineral filler with about 0.15 to 4.0 per cent of said organic compound by weight of the filler, and admixing ingredients of the composition comprising an ethylene containing polymer with at least about 50 mole per cent ethylene selected from the group consisting of polyethylene, copolymers of ethylene and propylene, and copolymers of ethylene and vinyl acetate, and mixtures thereof, with about 25 to 60 per cent by weight of the composition of said mineral filler and treating organic compound, and about 0.5 to 10 parts by weight of organic peroxide curing agent per 100 parts by weight of ethylene containing polymer; and thereafter heating the said admixed composition at about atmospheric pressure in a non-aqueous heat transfer medium to a temperature and for a dwell time sufficient to effect an in situ cross-linking cure of the filled, ethylene containing polymer and peroxide curing agent to a relatively dense and substantially non-porous cured filled polymer composition.

11. The method of claim 10 wherein the organic peroxide is a tertiary organic peroxide.

12. A method of making an electric cable having a cured relatively dense and substantially non-porous insulating composition about a conductor comprising ethylene containing polymer and mineral filler cured at substantially atmospheric pressure, comprising the steps of: treating a mineral filler with an organic compound selected from the group consisting of maleic anhydride, dimethyl itaconate, and acrylic acid, by admixing said mineral filler with about 0.15 to 4.0 per cent of said organic compound by weight of the filler, and preparing the insulating composition by admixing ingredients of the composition comprising an ethylene containing polymer, said mineral filler and treating organic compound, and curing agent; forming the insulation of admixed composition about a conductor; and thereafter heating the said formed insulation of the admixed composition at about atmospheric pressure in a non-aqueous heat transfer medium to a temperature and for a dwell time sufficient to effect an in situ cross-linking cure of the ethylene containing polymer to a relatively dense and substantially non-porous insulation of filled polymeric composition.

13. A method of making an electrical cable having a cured substantially non-porous insulating composition about a conductor comprising ethylene containing polymer and mineral filler cured at substantially atmospheric pressure, comprising the steps of: treating a mineral filler selected from the group consisting of aluminum silicate, aluminum oxide, calcium silicate, silica, magnesium silicate, titanium dioxide, and mixtures thereof, with an organic compound selected from the group consisting of maleic anhydride, dimethyl itaconate, and acrylic acid, by admixing said mineral filler with about 0.15 to 4.0 per cent of said organic compound by weight of the filler, and preparing the insulating composition by admixing ingredients of the composition comprising an ethylene containing polymer with at least about 50 mole per cent ethylene selected from the group consisting of polyethylene, copolymers of ethylene and propylene, and copolymers of ethylene and vinyl acetate, and mixtures thereof with about 25 to 60 per cent by weight of the composition of said mineral filler treated with said organic compound and about 0.5 to 10 parts by weight of organic peroxide curing agent per 100 parts by weight of ethylene containing polymer; forming the insulation of admixed composition about a conductor; and thereafter heating the said formed insulation of the admixed composition at about atmospheric pressure in a non-aqueous heat transfer medium to a temperature and for a dwell time sufficient to effect an in situ cross-linking cure of the ethylene-containing polymer to a relatively dense and substantially non-porous insulation of filled polymeric composition.

14. An electrical cable with a relatively dense and substantially non-porous cured insulation composition comprising a conductor and a layer of insulation overlying said conductor, said cured insulation composition comprising the cured product of: (a) an ethylene containing polymer, (b) a curing agent, and (c) a mineral filler treated with about 0.15 to 4.0 per cent of an organic compound selected from the group consisting of maleic anhydride, dimethyl itaconate, and acrylic acid, by weight of the filler, and which has been cured by heating at about atmospheric pressure in a non-aqueous heat transfer medium to a temperature and for a dwell time sufficient to cure substantially in situ the ethylene containing polymer to relatively dense and substantially non-porous cured filled polymer insulation composition about the conductor.

15. An electrical cable with a relatively dense and substantially non-porous cured insulation composition comprising a conductor and a layer of insulation overlying said conductor, said insulation composition comprising the cured product of: a) an ethylene containing polymer selected from the group consisting of polyethylene, copolymers of ethylene and propylene, and copolymers of ethylene and vinyl acetate, and mixtures thereof; about 25 to 60 per cent by weight of the composition of a mineral filler selected from the group consisting of aluminum silicate, calcium silicate, silica, and aluminum oxide, and mixtures thereof treated with about 0.15 to 4.0 per cent of an organic compound selected from the group consisting of maleic anhydride, dimethyl itaconate, and acrylic acid, by weight of the filler; and an organic peroxide curing agent in amount of about 0.5 to 10 parts by weight per hundred parts by weight of polymer; and which composition has been cross-link cured by heating at about atmospheric pressure in an non-aqueous heat transfer medium to a temperature and for a dwell time sufficient to cure substantially in situ the ethylene containing polymer to a relatively dense and substantially non-porous cured filled polymer insulation composition about the conductor.

* * * * *